G. W. COMBS.
GYRATORY STRUCTURE.
APPLICATION FILED JULY 17, 1909.
1,192,500.
Patented July 25, 1916.
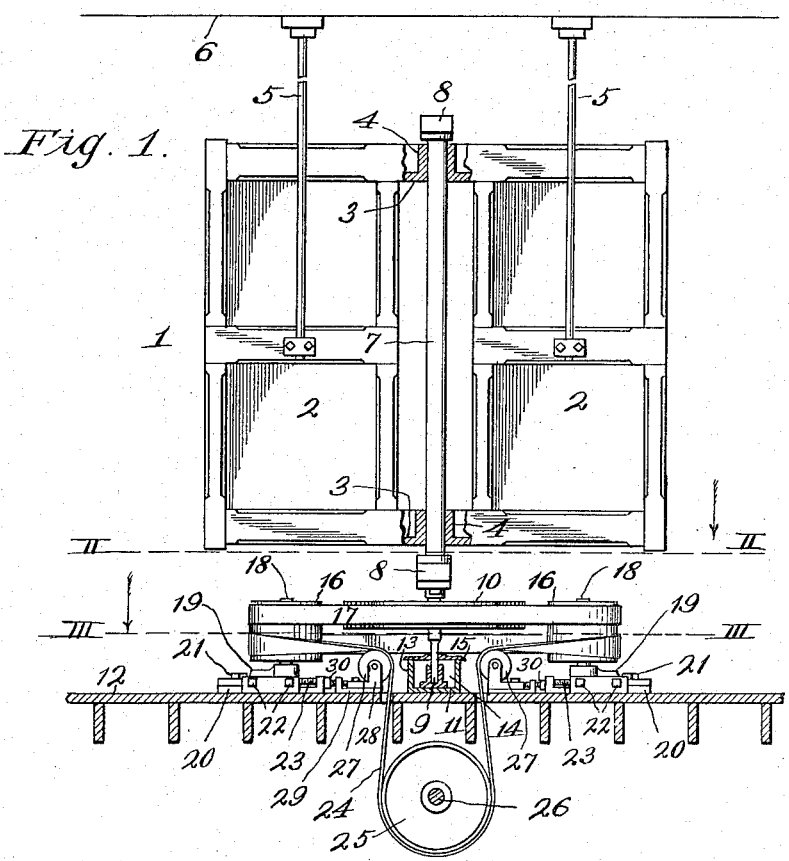
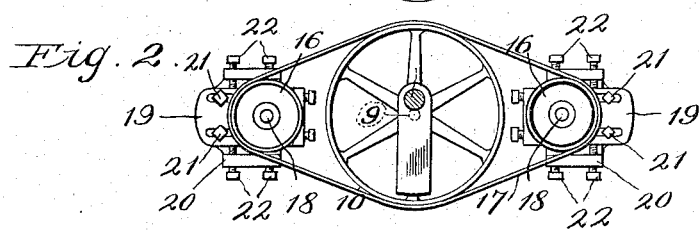
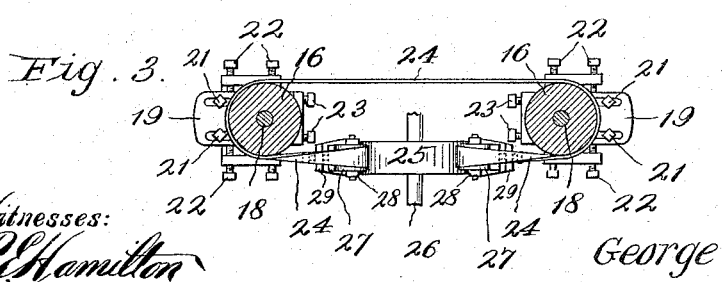
Witnesses:
R. E. Hamilton
M. Cox
Inventor;
George W. Combs,
By F. G. Fischer,
Atty.

UNITED STATES PATENT OFFICE.

GEORGE W. COMBS, OF LEAVENWORTH, KANSAS.

GYRATORY STRUCTURE.

1,192,500.  Specification of Letters Patent.  Patented July 25, 1916.

Application filed July 17, 1909. Serial No. 508,100.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

My invention relates to improvements in gyratory structures, such for instance as bolters, sifters, sorting-machines, screeners, etc., and my object is to provide novel means for driving the structure and restraining the same from abnormal throw, to the end that it may properly perform its function without subjecting the building containing the same to undue strain or vibration.

In the accompanying drawings, Figure 1 shows a side elevation partly in section of a gyratory structure provided with my improvements. Figs. 2 and 3 are horizontal sections on line II—II and III—III, respectively, of Fig. 1.

1 designates the gyratory structure, which in the present instance, consists of a pair of sieve-boxes 2, united by bridge-trees 3, having centrally-disposed bearings 4. Structure 1 is prevented from rotating by a plurality of rods 5 whereby it is freely supported from the ceiling 6 of the building containing the structure. Motion is imparted to the structure by a gyrator comprising a vertically-positioned shaft 7 journaled in bearings 4, and a plurality of eccentric-weights 8 secured to said shaft.

9 designates a pin which is eccentrically-secured to the shaft, but is in line with the center of rotation thereof, and provided with a fixed pulley 10 whereby it is driven. Pin 9 is loosely-mounted in a step-bearing 11 so that it is free to move laterally in any direction or gyrate with the structure when the same leaves its true gyratory path. Bearing 11 is secured to the floor 12 of the building and provided with an upwardly-extending wall 13, forming a lubricant chamber 14, covered by a cap 15 loosely-mounted thereon so that said cap may move with the eccentric-pin which extends therethrough.

16 designates a pair of diametrically-opposed pulleys arranged at opposite sides of pulley 10, and connected thereto by an endless flexible restraining member in the form of a belt 17, which drives pulley 10 and restrains the structure from abnormal throw by tending to hold said pulley in its true central position. Pulleys 16 are mounted upon short vertical shafts 18 journaled in bearings 19, adjustably secured to base-plates 20 by bolts 21.

22 designates a plurality of set-screws extending through upturned flanges of the base-plates and engaging opposite sides of bearings 19 to adjust the same laterally to bring pulleys 16 in line with each other and pulley 10, as shown in Fig. 2.

23 designates set-screws extending through upturned flanges on base-plates 20 and engaging bearings 19 for adjusting the same longitudinally to tension belt 17 and yielding driving means consisting of an endless belt 24, which travels around pulleys 16 and a driver 25, which latter is stationary so far as other than rotary motion is concerned, it being fixed to a main drive-shaft 26. Belt 24 is directed in its travel from driver 25 to pulleys 16 by guide-pulleys 27 mounted in bearings 28, adjustably-mounted upon base-plates 29, provided with set-screws 30 for adjusting said guide-pulleys toward each other, when it is desired to tension belt 24 independently of belt 17.

Having thus described my invention, what I claim is:—

1. In combination, a gyratory structure, a shaft thereto, a step-bearing independent of the structure for supporting the shaft, a steadying device including an endless member which drives said shaft and tends to hold the structure in its true gyratory path, and means for driving said steadying device, said driving means being independent of the shaft.

2. The combination of a normally-gyratable structure, a shaft for said structure, two diametrically-opposed pulleys adjacent said shaft, flexible means traveling around said shaft and the pulleys tending to restrain the structure from abnormal throw, and flexible means for driving said pulleys.

3. The combination of a normally-gyratable structure, a shaft thereto, a plurality of pulleys adjacent said shaft, means for adjusting said pulleys relatively to the shaft, flexible means engaging the pulleys and the shaft for driving the latter and tending to restrain the structure from abnormal throw, and yielding means for driving said pulleys.

4. In combination, a normally-gyratable structure, a vertically-positioned shaft journaled in said structure, a plurality of pulleys adjacent said shaft, endless means traveling around said pulleys and the shaft to drive the latter and restrain the structure from abnormal throw, shafts carrying said pulleys and capable of lateral adjustment in any direction, a driver, an endless member arranged to travel around said driver and the pulleys to drive the latter, and independently-supported adjustable means for guiding said endless driving member.

5. In combination, a gyratory structure, an endless member for steadying and driving said structure, an endless member independent of the structure for driving the first-mentioned endless member, and independent means for tensioning said endless members.

6. In combination, a normally-gyratable structure, a shaft thereto, a pulley on said shaft to drive the same, endless flexible means for driving said pulley and restraining the structure from abnormal gyration, and an endless flexible member for driving said flexible means, said member being independent of the pulley.

7. In combination, a normally gyratable body, a vertically positioned shaft thereto, a pulley fixed to said shaft, horizontal pulleys adjacent the first-mentioned pulley, an endless belt surrounding all of the pulleys to drive the first-mentioned pulley and restrain the body from abnormal movement, and endless means for driving the horizontal pulleys.

8. In combination, a normally gyratable body, a shaft thereto, two pulleys at opposite sides of said shaft and paralleling the same, an endless member operably-connecting said pulleys and the shaft to drive the latter and restrain the structure from abnormal movement, and a driven endless member engaging the pulleys to drive the same.

In testimony whereof I affix my signature, in presence of two witnesses.

GEORGE W. COMBS.

Witnesses:
G. H. SHEIDENBERGER,
F. A. PICKETT.

Copies of this patent may be obtained for five cents each, by addressing the "Commissioner of Patents, Washington, D. C."